United States Patent
Katogi et al.

(10) Patent No.: US 10,577,695 B2
(45) Date of Patent: Mar. 3, 2020

(54) METHOD FOR MANUFACTURING DISCHARGE SURFACE TREATMENT ELECTRODE AND METHOD FOR MANUFACTURING FILM BODY

(71) Applicant: Mitsubishi Electric Corporation, Chiyoda-ku (JP)

(72) Inventors: Hidetaka Katogi, Tokyo (JP); Nobuyuki Sumi, Tokyo (JP); Yoshikazu Nakano, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 65 days.

(21) Appl. No.: 15/574,526

(22) PCT Filed: Dec. 28, 2016

(86) PCT No.: PCT/JP2016/089181
§ 371 (c)(1),
(2) Date: Nov. 16, 2017

(87) PCT Pub. No.: WO2018/123050
PCT Pub. Date: Jul. 5, 2018

(65) Prior Publication Data
US 2018/0291511 A1    Oct. 11, 2018

(51) Int. Cl.
*B05D 5/12* (2006.01)
*C23C 24/08* (2006.01)
(Continued)

(52) U.S. Cl.
CPC .......... *C23C 24/087* (2013.01); *B22F 1/0011* (2013.01); *B22F 3/008* (2013.01);
(Continued)

(58) Field of Classification Search
CPC ..... C23C 24/087; C23C 24/103; B33Y 10/10; B33Y 80/10; B33F 3/008; B33F 3/1109;
(Continued)

(56) References Cited

U.S. PATENT DOCUMENTS 3,423,247 A * 1/1969 Van Lier ................. H01M 4/86
                                                                                                         429/529
5,870,663 A    2/1999 Stucker et al.
(Continued)

FOREIGN PATENT DOCUMENTS

CH          693 872 A5    3/2004
JP          2003-301202 A    10/2003
(Continued)

OTHER PUBLICATIONS

International Search Report and Written Opinion dated Apr. 4, 2017 in PCT/JP2016/089181 filed Dec. 28, 2016.
(Continued)

*Primary Examiner* — Brian K Talbot
(74) *Attorney, Agent, or Firm* — Oblon, McClelland, Maier & Neustadt, L.L.P.

(57) ABSTRACT

A method for manufacturing a discharge surface treatment electrode includes: a first laying of laying powder particles to form a first powder layer; and a first binding of binding some of the powder particles in the first powder layer to each other. The method further includes: a second laying of further laying the powder particles on the first powder layer in which some of the powder particles are bound to each other to form a second powder layer; and a second binding of binding some of the powder particles in the second powder layer to each other to form a stacked body of granulated particles. A region having a different porosity from another region is formed inside the stacked body.

12 Claims, 10 Drawing Sheets

(51) Int. Cl.
  *B22F 7/02* (2006.01)
  *B33Y 10/00* (2015.01)
  *B22F 1/00* (2006.01)
  *B22F 3/00* (2006.01)
  *C23C 24/10* (2006.01)
  *B22F 3/11* (2006.01)
  *B33Y 80/00* (2015.01)
  *B05D 1/12* (2006.01)
  *B05D 7/00* (2006.01)
  *B05D 3/02* (2006.01)

(52) U.S. Cl.
  CPC ............. *B22F 3/1109* (2013.01); *B22F 7/02* (2013.01); *B33Y 10/00* (2014.12); *C23C 24/103* (2013.01); *B05D 1/12* (2013.01); *B05D 3/02* (2013.01); *B05D 3/0254* (2013.01); *B05D 5/12* (2013.01); *B05D 7/50* (2013.01); *B05D 7/536* (2013.01); *B22F 2304/10* (2013.01); *B33Y 80/00* (2014.12)

(58) Field of Classification Search
  CPC .......... B33F 7/02; B33F 7/002; B33F 1/0011; B05D 1/12; B05D 3/02; B05D 3/0254; B05D 5/12; B05D 7/50; B05D 7/536
  USPC .......................................... 427/58, 189, 202
  See application file for complete search history.

(56) References Cited

U.S. PATENT DOCUMENTS

| | | | |
|---|---|---|---|
| 7,138,208 B2* | 11/2006 | Tanjo | H01M 4/131 429/145 |
| 2006/0021868 A1 | 2/2006 | Goto et al. | |
| 2006/0134526 A1* | 6/2006 | Han | H01M 2/145 429/251 |
| 2007/0264550 A1* | 11/2007 | Zhang | H01M 4/8807 429/522 |
| 2009/0155678 A1* | 6/2009 | Less | H01M 2/1673 429/144 |
| 2011/0239446 A1* | 10/2011 | Morishima | H01M 4/0404 29/623.5 |
| 2012/0094016 A1* | 4/2012 | Taira | H01G 9/045 427/80 |
| 2016/0181651 A1* | 6/2016 | Tanihara | H01M 4/0409 118/712 |

FOREIGN PATENT DOCUMENTS

| | | |
|---|---|---|
| JP | 2005-213557 A | 8/2005 |
| JP | 2006-322034 A | 11/2006 |
| JP | 4684973 B2 | 5/2011 |
| JP | 2013-159818 A | 8/2013 |
| JP | 2013-159828 A | 8/2013 |
| JP | 2015-060703 * | 9/2013 |
| JP | 2015-140461 A | 8/2015 |
| WO | WO 2007/133258 A2 | 11/2007 |

OTHER PUBLICATIONS

Office Action dated Jul. 10, 2018 in German patent Application No. 11 2016 002 010.4, (with English Translation), 12 pages.

* cited by examiner

FIG.5
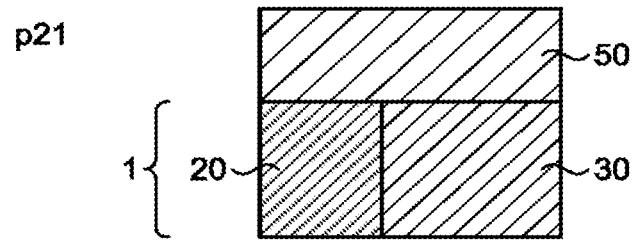
p21
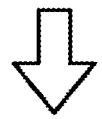
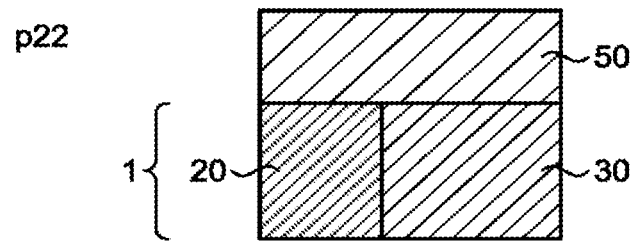
p22
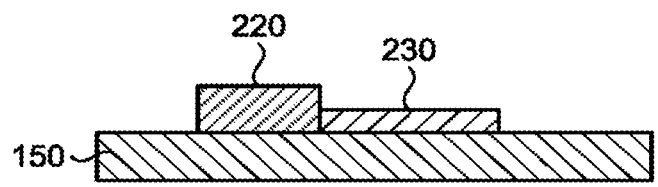
FIG.6
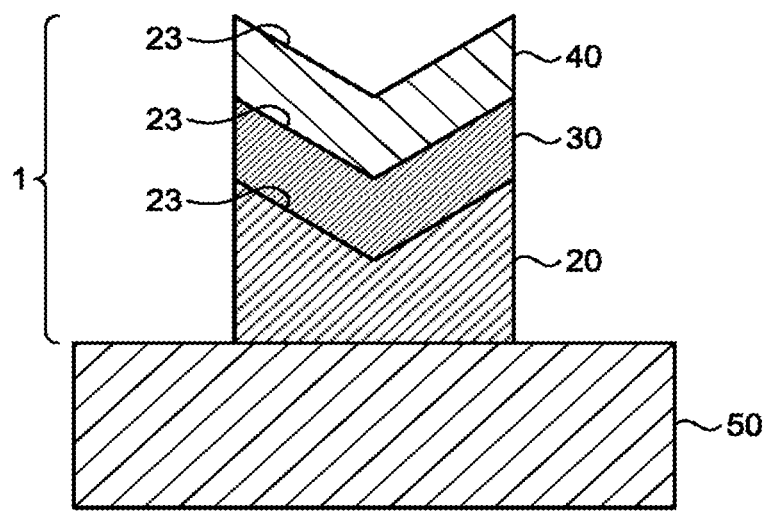

METHOD FOR MANUFACTURING DISCHARGE SURFACE TREATMENT ELECTRODE AND METHOD FOR MANUFACTURING FILM BODY

FIELD

The present invention relates to a method for manufacturing a discharge surface treatment electrode used for a discharge surface treatment and a method for manufacturing a film body.

BACKGROUND

There is a discharge surface treatment technique in which a film is formed on a surface of a workpiece using a discharge surface treatment electrode. In Patent Literature 1, a green compact obtained by compacting a powder inside a mold, a sintered compact obtained by sintering a green compact, or a calcined compact obtained by calcining a green compact is used for a discharge surface treatment electrode. In a discharge surface treatment technique using a discharge surface treatment electrode, the discharge surface treatment electrode is caused to face a workpiece and a discharge phenomenon is generated between the discharge surface treatment electrode and the workpiece. A powder collapses from the discharge surface treatment electrode and floats due to the discharge explosive force of the discharge phenomenon. Then, the floating powder is melted and solidified on the surface of the workpiece, and a film is thereby formed on the surface of the workpiece.

In the discharge surface treatment electrode, it is necessary for a powder to collapse due to the discharge explosive force. Thus, in the discharge surface treatment electrode, it is necessary to provide a certain distance between powder particles forming the discharge surface treatment electrode, i.e., to control the porosity of the discharge surface treatment electrode.

CITATION LIST

Patent Literature

Patent Literature 1: Japanese Patent Application Laid-open No. 2006-322034

SUMMARY

Technical Problem

However, in order to control the porosity by the above conventional technique, there is a problem in that it takes time to set a solidification condition and it is difficult to stabilize a quality. As the solidification condition, the magnitude of the pressure for compacting a powder inside a mold and time for applying the pressure are exemplified.

Furthermore, it is in some cases necessary to change the shape of a discharge surface treatment electrode according to the treatment condition of the discharge surface treatment, i.e., the material of a workpiece used for the discharge surface treatment and the film quality of a film formed on the surface of the workpiece. In this case, it is necessary to manufacture a mold according to the shape of a discharge surface treatment electrode or to form a desired shape by post-processing a discharge surface treatment electrode manufactured using a common mold. Therefore, cost of manufacturing a discharge surface treatment electrode is increased due to the cost of manufacturing a mold according to the shape or cost of performing post-processing. Examples of the post-processing performed on a discharge surface treatment electrode include discharge processing.

The present invention has been achieved in view of the above, and an object of the present invention is to obtain a method for manufacturing a discharge surface treatment electrode that can control the porosity with a stable quality while suppressing manufacturing cost.

Solution to Problem

In order to solve the above problems and to achieve the object, the present invention includes: a first laying step of laying powder particles so as to form a first powder layer; and a first binding step of binding some of the powder particles in the first powder layer to each other. The present invention further includes: a second laying step of further laying the powder particles on a powder layer in which some of the powder particles are bound to each other so as to form a second powder layer; and a second binding step of binding some of the powder particles in the second powder layer to each other so as to form a stacked body of the powder particles. A region having a different porosity from another region is formed inside the stacked body.

Advantageous Effects of Invention

The present invention exhibits an effect in that a discharge surface treatment electrode that has a high degree of freedom in shape and that can freely set the porosity can be obtained without using a mold.

BRIEF DESCRIPTION OF DRAWINGS

FIG. 5 is a diagram illustrating another example of the discharge surface treatment electrode according to the first embodiment and another example of the discharge surface treatment using the discharge surface treatment electrode.

FIG. 6 is a diagram illustrating still another example of the discharge surface treatment electrode according to the first embodiment.

DESCRIPTION OF EMBODIMENT

Hereinafter, embodiments of a method for manufacturing a discharge surface treatment electrode and a method for manufacturing a film body according to the present invention will be described in detail based on the drawings. The present invention is not limited by these embodiments.

First Embodiment

Figure 1:
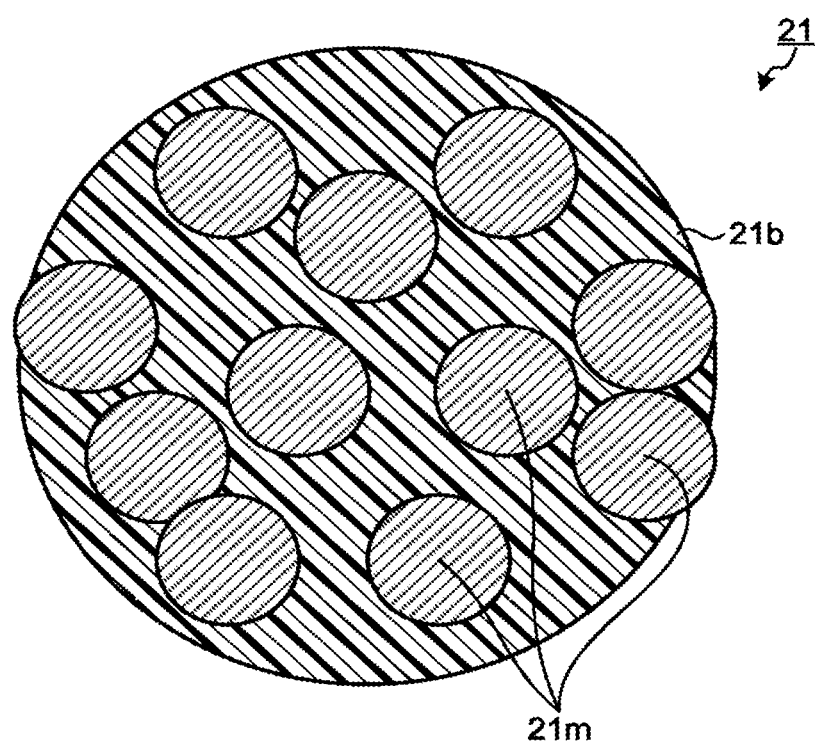
FIG. 1 is a cross-sectional view of a granulated powder particle used for a discharge surface treatment electrode according to a first embodiment of the present invention.

FIG. 1 is a cross-sectional view of a granulated powder particle used for a discharge surface treatment electrode according to a first embodiment of the present invention. As illustrated in FIG. 1, a granulated powder particle 21 is a powder obtained by collecting and binding a plurality of metal powder particles 21m with a first binder 21b. In the following description, collecting and binding a plurality of metal powder particles with a binder is referred to as granulation.

In a discharge surface treatment using the discharge surface treatment electrode, the metal powder particles 21m are caused to float between the discharge surface treatment electrode and a workpiece. Thus, it is necessary to make the particle diameter of the metal powder particles 21m sufficiently smaller than the gap between the discharge surface treatment electrode and the workpiece. Specifically, the particle diameter is desirably 1 μm to 10 μm. By binding the metal powder particles 21m to each other with the first binder 21b, the granulated powder particle 21 having a particle diameter of 150 μm or more is obtained.

In a step of manufacturing the discharge surface treatment electrode according to the first embodiment, when prepared metal powder particles have a particle diameter of 1 μm to 10 μm, the metal powder particles are bound to each other with the first binder 21b, and when prepared metal powder particles have a particle diameter of larger than 10 μm, the metal powder particles are subjected to pulverization or the like to obtain metal powder particles having a particle diameter of 1 μm to 10 μm and then the metal powder particles are bound to each other with the first binder 21b to obtain the granulated powder particle 21 having a particle diameter of 150 μm. The particle diameter referred to herein is indicated by a value called D50. D50 is a value determined from a particle size distribution of the whole powder. Specifically, when a powder is divided into two, i.e., particles having a larger particle diameter than a certain particle diameter and particles having a smaller particle diameter than the certain particle diameter, the particle diameter at which the particles having a larger particle diameter than the certain particle diameter become equal to the particles having a smaller particle diameter than the certain particle diameter is indicated as a D50 value. Metal powder particles having a particle diameter of larger than 10 μm may be used for manufacturing the discharge surface treatment electrode without pulverizing and granulating the metal powder particles. For example, there is a case where metal powder particles having a particle diameter of 50 μm can be used for manufacturing the discharge surface treatment electrode without granulating the metal powder particles. That is, a powder used for manufacturing the discharge surface treatment electrode also includes metal powder particles that are not granulated.

Examples of a metal used for the metal powder particles 21m include titanium (Ti), silicon (Si), chromium (Cr), iron (Fe), cobalt (Co), nickel (Ni), zirconium (Zr), molybdenum (Mo), barium (Ba), rhenium (Re), tungsten (W), titanium carbide (TiC), cobalt chromium (CoCr), tungsten carbide (WC), titanium silicon carbide (TiSiC), and molybdenum sulfide (MoS).

The first binder 21b contains a solute and a solvent. As the solute of the first binder 21b, paraffin is exemplified. As the solvent of the first binder 21b, an alcohol-based or ketone-based nonpolar solvent that is a nonaqueous medium liquid is exemplified. The content of paraffin in the first binder 21b is desirably at least 0.1% by weight and no more than 2.0% by weight.

The metal powder particle 21m having a particle diameter of 1 μm to 10 μm needs to be handled carefully when being handled as they are, but by binding the metal powder particles 21m to each other with the first binder 21b to form the granulated powder particle 21 of 150 μm or more, it becomes easy to handle the metal powder particles 21m.

Figure 2:
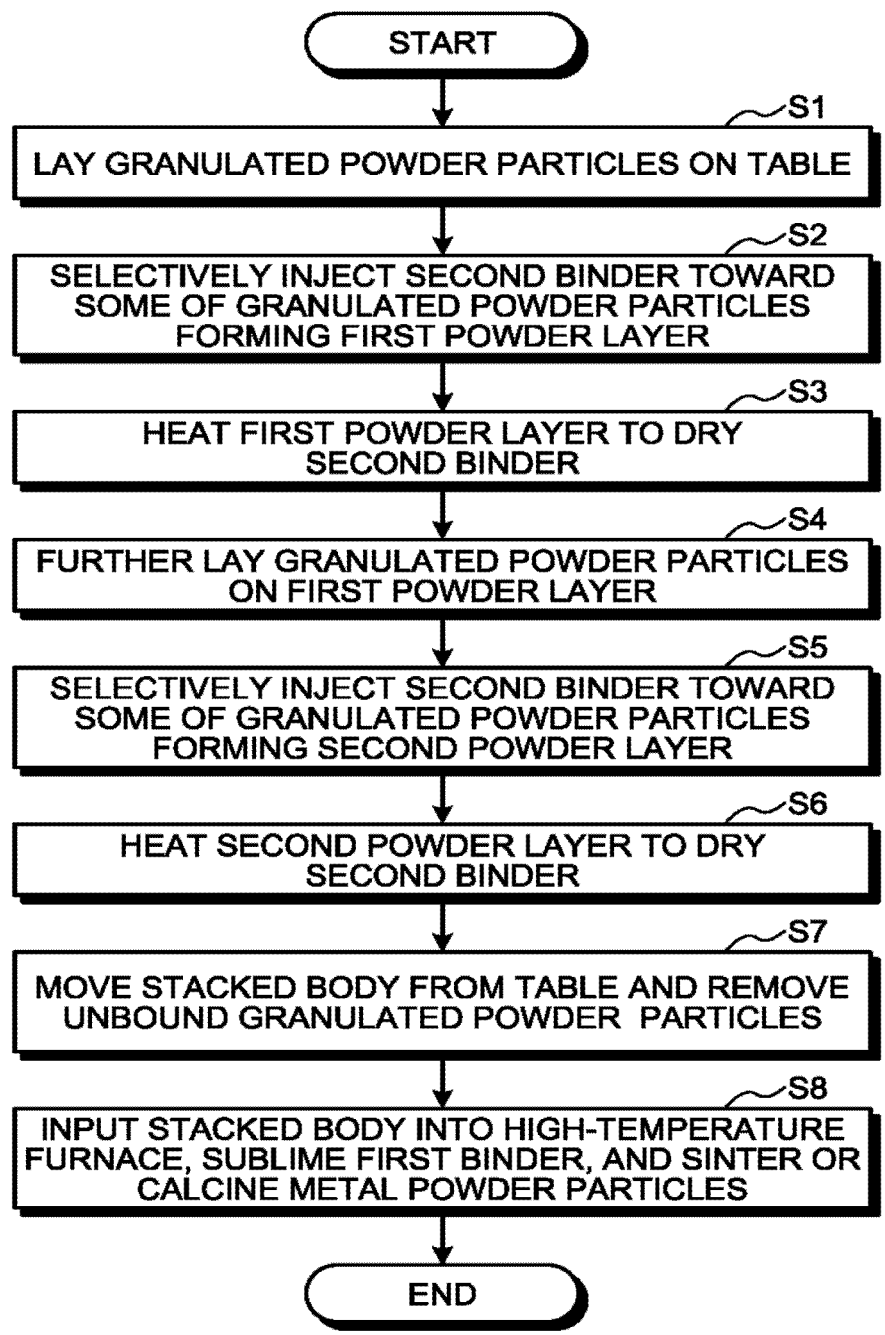
FIG. 2 is a flowchart illustrating a method for manufacturing the discharge surface treatment electrode according to the first embodiment.
Figure 3:
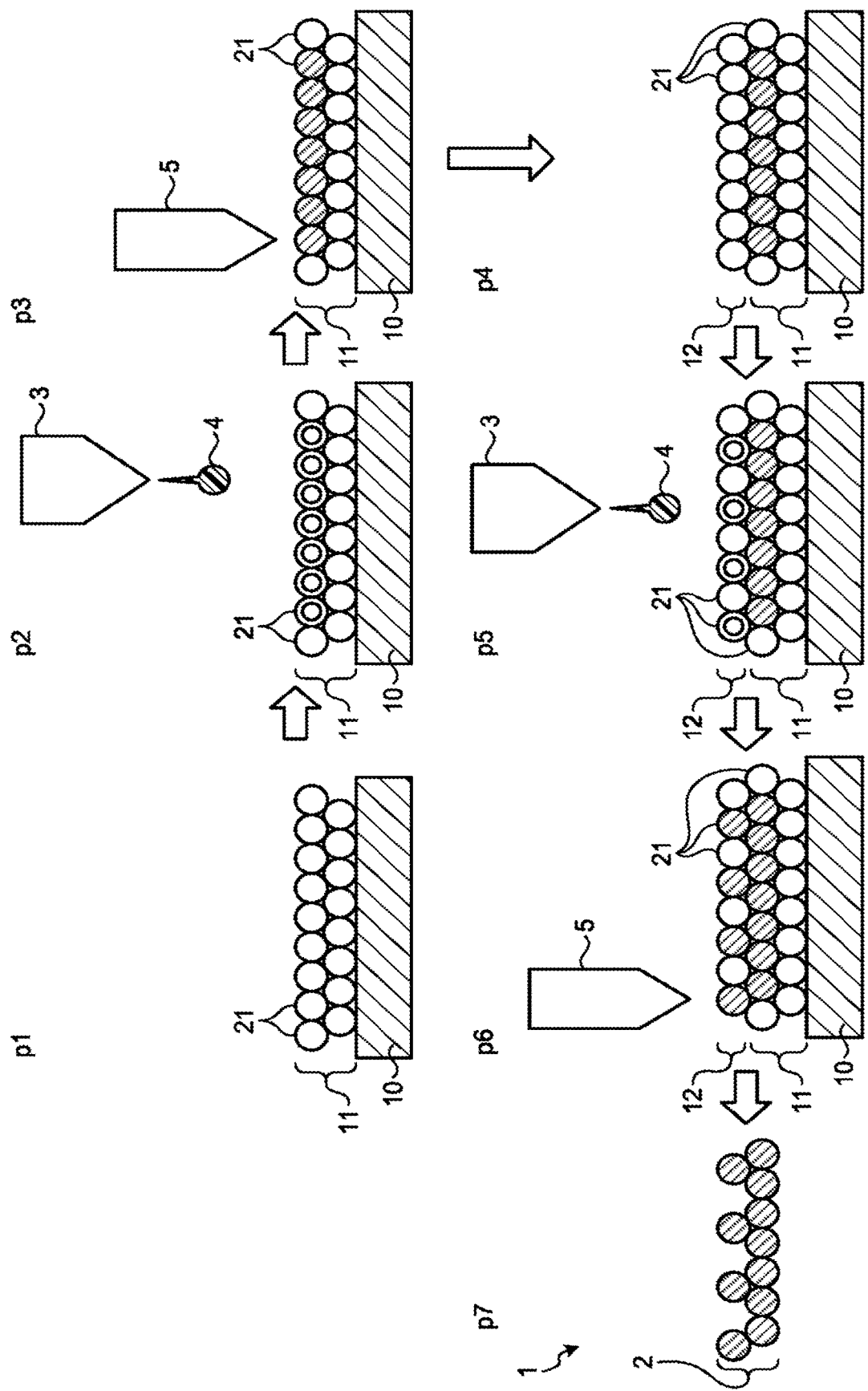
FIG. 3 is a diagram illustrating steps of manufacturing the discharge surface treatment electrode according to the first embodiment.

FIG. 2 is a flowchart illustrating a method for manufacturing a discharge surface treatment electrode 1 according to the first embodiment. FIG. 3 is a diagram illustrating steps of manufacturing the discharge surface treatment electrode 1 according to the first embodiment. In the drawings of the present application, granulated powder particles to which a second binder described below has been supplied are indicated by double circles, granulated powder particles that are bound by the second binder or sintered or calcined metal powder particles are indicated by hatched circles, and granulated powder particles to which the second binder is not supplied are indicated by hollow circles.

First, in process p1 illustrated in FIG. 3, a first laying step of laying the granulated powder particles 21 on a table 10 is performed (step S1). In the first laying step, a first powder layer 11 is formed on the table 10. Here, the table 10 is used as a base on which the granulated powder particles 21, which are a powder, are laid. Subsequently, in process p2 illustrated in FIG. 3, a binder injection device 3 selectively injects a second binder 4 toward some of the granulated powder particles 21 forming the first powder layer 11 (step S2). As a result, the second binder 4 is supplied to some of the granulated powder particles 21. Here, it is satisfactory if the binder injection device 3 is an injection device that can control the injection position of the second binder 4. For example, an injection device used for a powder additive manufacturing apparatus also called a 3D printer can be used.

Furthermore, as the second binder 4, a material that is in a liquid state at the time of injection and that is solidified after being dried is used. The same material as that of the first binder 21b used for the granulated powder particle 21 is desirably used for the second binder 4. The second binder 4 is preferably injected from the binder injection device 3 by spray atomization by which the second binder 4 is less likely to contain coarse paraffin. If coarse paraffin is not contained in the injected second binder 4, paraffin is less likely to remain as a foreign matter when the second binder 4 is heated and dried.

In addition, the second binder 4 is desirably injected in an inert gas atmosphere or a vacuum environment. Examples of the inert gas include nitrogen, argon, and helium. However, these descriptions do not exclude that the second binder 4 is injected in the atmosphere.

Subsequently, in process p3 illustrated in FIG. 3, the first powder layer 11 is heated by a heating device 5 to dry the second binder 4 (step S3). As a result, the granulated powder particles 21 are bound to each other at a place where the second binder 4 has been supplied in the first powder layer 11. A first binding step of binding the granulated powder particles 21 to which the second binder 4 has been supplied in the first powder layer 11 to each other is performed by injecting the second binder 4 in step S3 and drying the second binder 4 in step S4.

The type of a heat source used for the heating device 5 is not particularly limited. The granulated powder particle 21 has a specific resistance much higher than the metal powder particle 21m. Thus, in the heating in step S3, in place of an electric heat source exemplified by an electron beam, a non-electric heat source exemplified by a heater or a light source exemplified by a laser may be used as a heat source used for the heating device 5.

Subsequently, in process p4 illustrated in FIG. 3, a second laying step of further laying the granulated powder particles 21 on the first powder layer 11 is performed (step S4). In the second laying step, a second powder layer 12 is formed on the first powder layer 11.

Subsequently, in process p5 illustrated in FIG. 3, the binder injection device 3 selectively injects the second binder 4 toward some of the granulated powder particles 21 forming the second powder layer 12 (step S5). As a result, the second binder 4 is supplied to some of the granulated powder particles 21. As illustrated in process p5 of FIG. 3, the area to which the second binder 4 is supplied is smaller than that in the first powder layer 11. That is, in the second powder layer 12, the number of the granulated powder particles 21 bound to each other is smaller than that in the first powder layer 11.

Subsequently, in process p6 illustrated in FIG. 3, the second powder layer is heated by the heating device 5 to dry the second binder 4 (step S6). As a result, the granulated powder particles 21 are bound to each other at a place where the second binder 4 has been supplied in the second powder layer 12. A second binding step of binding the granulated powder particles 21 to which the second binder 4 has been supplied in the second powder layer 12 to each other is performed by supplying the second binder 4 in step S5 and drying the second binder 4 in step S6. In the second binding step, the granulated powder particles 21 to which the second binder 4 has been supplied in the second powder layer 12 are also bound to the first powder layer 11. As a result, a stacked body 2 in which a plurality of the granulated powder particles 21 are bound to each other is obtained. Thereafter, by repeating the second laying step and the second binding step, the stacked body 2 having a desired thickness is obtained.

Subsequently, in process p7 illustrated in FIG. 3, the stacked body 2 is moved from the table 10, and the granulated powder particles 21 that are not bound are removed (step S7). In order to facilitate removal of the stacked body 2 from the table 10, the second binder 4 is injected into the first powder layer 11 such that the second binder 4 does not reach the granulated powder particles 21 that are in contact with the table 10. As a result, the region formed by the granulated powder particles 21 that are in contact with the table 10 becomes a non-bound region that is not bound to the table 10; therefore, removal of the stacked body 2 is facilitated. It is possible to supply, to the granulated powder particles 21 that are in contact with the table 10, the second binder 4, the amount of which is smaller than the amount of the second binder 4 supplied to the granulated powder particles 21 stacked on the upper layer. In this case, the binding force of the granulated powder particles 21 that are in contact with the table 10 to the table 10 is lower than the binding force between the granulated powder particles 21 in the upper layer. As a result, the region formed by the granulated powder particles 21 that are in contact with the table 10 becomes a low bound region in which the binding force to the table 10 is reduced, and removal of the stacked body 2 can be facilitated.

Subsequently, an inputting step of inputting the stacked body 2 from which the granulated powder particles 21 that are not bound has been removed into a high-temperature furnace, subliming the first binder 21b, and sintering or calcining the metal powder particles 21m is performed to obtain the discharge surface treatment electrode 1 (step S8).

In the discharge surface treatment electrode 1 manufactured by the manufacturing method described above, by controlling the position to which the second binder 4 is supplied, the ratio of the granulated powder particles 21 that are bound in the first powder layer 11 can be different from that in the second powder layer 12. To put it in other words, the ratio of the granulated powder particles 21 that are not bound in the first powder layer 11 can be different from that in the second powder layer 12, i.e., the porosity of the region formed by using the first powder layer 11 can be different from that of the region formed by using the second powder layer 12.

In the example illustrated in FIG. 3, the ratio of the granulated powder particles 21 bound to each other in the second powder layer 12 is lower than the ratio of the granulated powder particles 21 bound to each other in the first powder layer 11. That is, the porosity of the second powder layer 12 is higher than that of the first powder layer 11. In this manner, in the method for manufacturing the discharge surface treatment electrode 1 according to the first embodiment, a region with a different porosity from the other regions can be formed inside the discharge surface treatment electrode 1. In addition, by reducing the porosity of the first powder layer 11 stacked in the earlier stage, stacking can be stabilized at the initial stage of formation of the stacked body 2. The porosity of the first powder layer 11 may be increased and the porosity of the second powder layer 12 may be reduced.

Furthermore, the granulated powder particles 21 at a desired position can be bound to each other. Thus, by changing the position to which the second binder 4 is supplied, the discharge surface treatment electrode 1 can be manufactured in various shapes. Therefore, it is unnecessary to manufacture molds according to discharge surface treatment electrodes having different shapes unlike the case of manufacturing a discharge surface treatment electrode by forming a green compact. In addition, it is unnecessary to form a discharge surface treatment electrode into a desired shape by performing post-processing. Thus, the cost of manufacturing a mold according to a shape or cost of performing post-processing can be reduced. This enables manufacturing cost of the discharge surface treatment electrode to be suppressed. These descriptions do not exclude shaping the discharge surface treatment electrode 1 according to the first embodiment by post-processing the discharge surface treatment electrode 1.

When a material that is solid at room temperature and has a melting point of 100° C. or lower is used for the second binder 4, the second binder 4 that has been injected into the granulated powder particle 21 is naturally solidified in a temperature environment lower than or equal to the melting point, and the granulated powder particles 21 can be bound to each other. Thus, in the case where the material that is solid at room temperature and has a melting point of 100° C. or lower is used for the second binder 4, even if the heating steps in steps S3 and S6 are omitted, the granulated powder particles 21 can still be bound to each other.

The material of the metal powder particles 21m contained in the granulated powder particles 21 used in the first powder layer 11 may be different from that used in the second powder layer 12. It is of course possible to, in a case of repeating the second laying step and the second binding step, use a different material for the metal powder particles 21m contained in the granulated powder particles 21 in each of the stacked power layers.

In addition, because the granulated powder particles 21 themselves include the first binder 21b, the injection of the second binder 4 in steps S2 and S5 may be omitted and some of the granulated powder particles 21 laid may be heated to melt the first binder 21b contained in the granulated powder particles 21. In this case, the melted first binder 21b is cooled and solidified again, and the granulated powder particles 21 are thereby bound to each other.

It is possible to omit inputting the stacked body 2 into a high-temperature furnace in step S8 depending on the conditions required for a film formed on a workpiece by a discharge surface treatment using the discharge surface treatment electrode 1. Omission of inputting the stacked body into a high-temperature furnace causes the first binder 21b and the second binder 4 not to be sublimed and causes paraffin to remain in the discharge surface treatment electrode 1. In a case where a discharge surface treatment is performed using the discharge surface treatment electrode 1 in which paraffin remains, paraffin may be mixed in a film formed on a workpiece. That is, if there is no problem in mixing paraffin in a film formed on a workpiece, it is possible to omit inputting the stacked body 2 into a high-temperature furnace in step S8.

Furthermore, it is difficult to bind the metal powder particles 21m having a particle diameter suitable for a discharge surface treatment, i.e., having a particle diameter of 1 μm to 10 μm, to each other with the second binder 4 at a desired position due to an influence of wettability. For this reason, the coarse granulated powder particle 21 is used for a powder laid in steps S1 and S4. However, under a condition under which an influence of wettability can be ignored, not the granulated powder particles 21 but metal powder particles that are not granulated may be directly laid as a powder used for the discharge surface treatment electrode. Examples of the condition under which an influence of wettability can be ignored include a case where even with the discharge surface treatment electrode 1 manufactured using metal powder particles having a particle diameter less affected by wettability, a film can be formed on a workpiece by a discharge surface treatment. For example, there is a case where the discharge surface treatment electrode 1 can be manufactured by directly laying metal powder particles having a particle diameter of 50 μm.

Figure 4:
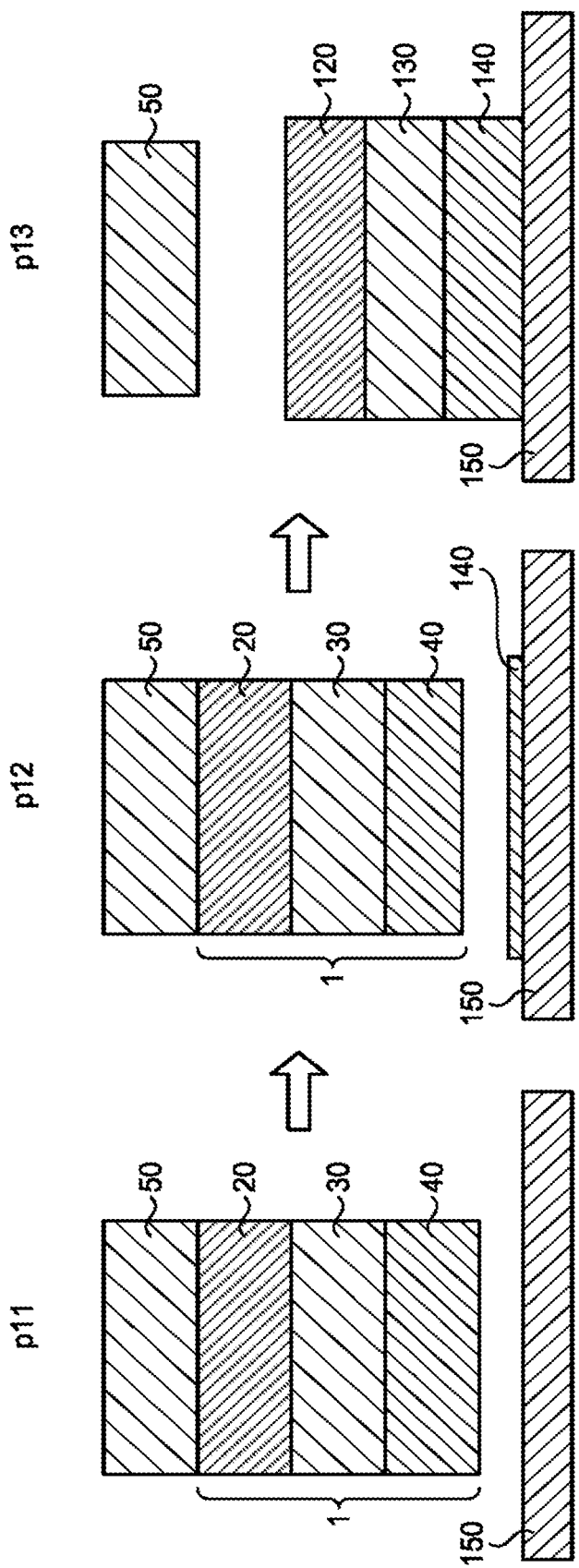
FIG. 4 is a diagram illustrating an example of the discharge surface treatment electrode according to the first embodiment and an example of a discharge surface treatment using the discharge surface treatment electrode.

Next, a discharge surface treatment using the discharge surface treatment electrode 1 having regions with different porosities will be described. FIG. 4 is a diagram illustrating an example of the discharge surface treatment electrode according to the first embodiment and an example of a discharge surface treatment using the discharge surface treatment electrode 1. The discharge surface treatment electrode 1 illustrated in FIG. 4 is bonded to a jig 50 for attaching the discharge surface treatment electrode 1 to a discharge surface treatment device (not illustrated). In addition, the discharge surface treatment electrode 1 is disposed so as to face a workpiece 150. The jig 50 is an energizing unit for generating a discharge phenomenon between the discharge surface treatment electrode 1 and the workpiece 150, and is made of a conductive material. Examples of the conductive material used for the jig 50 include a metal, an alloy, and conductive ceramics.

In the discharge surface treatment electrode 1, a plurality of regions, i.e., a first region 20, a second region 30, and a third region 40, are stacked in this order from the side of the jig 50 toward the workpiece 150. In the discharge surface treatment electrode 1, the region closer to the jig 50 has a smaller porosity. That is, the second region 30 has a smaller porosity than the third region 40, and the first region 20 has a smaller porosity than the second region 30.

By applying a voltage to the jig 50 in process p11, a voltage is also applied to the discharge surface treatment electrode 1, and a discharge phenomenon is generated between the discharge surface treatment electrode 1 and the workpiece 150. As a result of the generation of the discharge phenomenon, a powder collapses in the third region 40, which is the outermost layer, and a first film 140 is formed on the workpiece 150 as illustrated in process p12. Subsequently, as illustrated in process p13, a powder collapses in the second region 30 and then in the first region 20, and a second film 130 and a third film 120 are formed on the workpiece 150. As a result, a film body having a film formed on the workpiece 150 is obtained.

In the discharge surface treatment electrode 1 illustrated in FIG. 4, the starting points of discharge generation are dispersed due to the high porosity in the third region 40, which is the outermost layer, and therefore a discharge phenomenon is easily started when a voltage is applied to the discharge surface treatment electrode 1.

In addition, a film formed from a region with a high porosity has a low film density, and a film formed from a region with a low porosity has a high film density. That is, by controlling the porosity in the discharge surface treatment electrode 1, the film density of a film formed on the workpiece 150 can be controlled. Here, the first film 140 indicated in process p13 in FIG. 4 is formed mainly from the third region 40 of the discharge surface treatment electrode 1, the second film 130 is formed mainly from the second region 30 of the discharge surface treatment electrode 1, and the third film 120 is formed mainly from the first region 20 of the discharge surface treatment electrode 1. Thus, the second film 130 has a higher film density than the first film 140, and the third film 120 has a higher film density than the second film 130.

Furthermore, by making the materials of the metal powder particles 21m used for the first region 20, the second region 30, and the third region 40 different from one another, the materials forming the first film 140, the second film 130, and the third film 120 formed on the workpiece 150 can be made different from one another. That is, by controlling the porosity and the material of the metal powder particles 21m for each region in the discharge surface treatment electrode 1, the film quality of a film formed on the workpiece 150 can be easily controlled.

Furthermore, while a region with a low porosity, such as the first region 20, collapses to form a film, it is possible to create an environment in which a large number of the metal powder particles 21m are present between the discharge surface treatment electrode 1 and the workpiece 150, and therefore a discharge surface treatment efficiency can be improved.

Next, a description will be given of another example of the discharge surface treatment using the discharge surface treatment electrode 1 in which the porosity is made different for each region. FIG. 5 is a diagram illustrating another example of the discharge surface treatment electrode 1 according to the first embodiment and another example of the discharge surface treatment using the discharge surface treatment electrode 1. The discharge surface treatment electrode 1 illustrated in FIG. 5 bonded to the jig 50. In addition, the discharge surface treatment electrode 1 is disposed so as to face the workpiece 150.

The discharge surface treatment electrode 1 illustrated in FIG. 5 has regions with different porosities in a direction perpendicular to a direction in which the granulated powder particles 21 are stacked in the step of manufacturing the discharge surface treatment electrode 1. Specifically, the discharge surface treatment electrode 1 has the first region 20 with a low porosity in a region on the left side of the paper surface and the second region 30 with a high porosity in a region on the right side of the paper surface.

A film formed by applying a voltage to the jig 50 in process p21 illustrated in FIG. 5 and generating a discharge phenomenon in process p22 has regions with different film qualities in the plane direction of the workpiece 150. Specifically, a first film 220 on the left side of the paper surface formed mainly from the first region 20 has a higher film density and a larger thickness than a second film 230 on the right side of the paper surface formed mainly from the second region 30.

In this way, by using the discharge surface treatment electrode 1 having regions with different porosities in a direction perpendicular to the direction in which the granulated powder particles 21 are stacked, the film quality of a film can be varied in the plane direction of the workpiece 150. Furthermore, the discharge surface treatment electrode 1 having regions with different porosities in a direction perpendicular to the direction in which the granulated powder particles 21 are stacked can be also easily manufactured by controlling the position of the granulated powder particles 21 to be bound to each other by the manufacturing method illustrated in FIGS. 2 and 3. The discharge surface treatment electrode 1 is only required to have a region with a porosity different from the other regions. For example, in both of the direction in which the granulated powder particles are stacked and a direction perpendicular to the direction in which the granulated powder particles are stacked, the discharge surface treatment electrode 1 may have regions with different porosities.

Next, a description will be given of still another example of the discharge surface treatment electrode 1 in which the porosity is made different for each region. FIG. 6 is a diagram illustrating still another example of the discharge surface treatment electrode 1 according to the first embodiment. The discharge surface treatment electrode 1 illustrated in FIG. 6 is bonded to the jig 50 for attaching the discharge surface treatment electrode 1 to a discharge surface treatment device (not illustrated).

The discharge surface treatment electrode 1 illustrated in FIG. 6 has a shape having a recess portion on the surface thereof. Each of the first region 20, the second region 30, and the third region 40 having different porosities from one another is also formed into a shape having a recess portion 23 on the surface side thereof. Each of the second region 30 and the third region 40, which are not in direct contact with the jig 50, has a V shape as a whole. The discharge surface treatment electrode 1 in which the regions each having an even porosity are each shifted in the direction in which the granulated powder particles 21 are stacked can also be easily manufactured by controlling the position of the granulated powder particles 21 to be bound.

Figure 7:
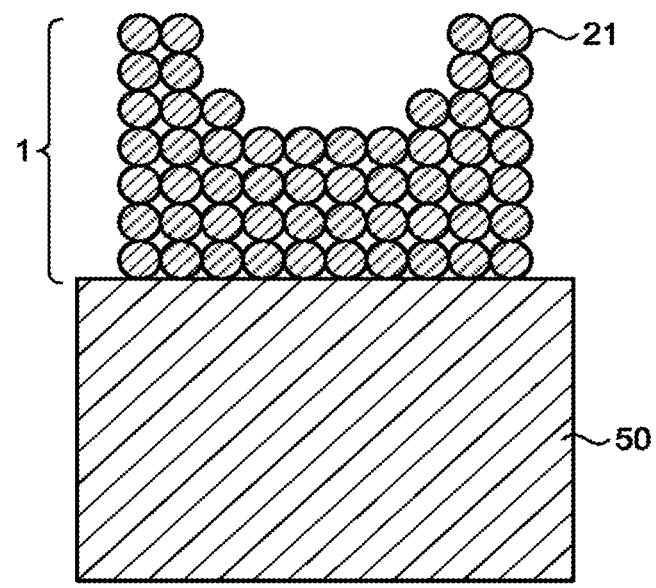
FIG. 7 is a diagram illustrating a discharge surface treatment electrode according to a first modification of the first embodiment.

Next, a description will be given of the discharge surface treatment electrode 1 according to a first modification of the first embodiment. FIG. 7 is a diagram illustrating discharge surface treatment electrode 1 according the first modification of the first embodiment. In the discharge surface treatment electrode 1 according to the first modification, the discharge surface treatment electrode 1 is bound to the jig 50 in the step of manufacturing the discharge surface treatment electrode 1. Specifically, in the manufacturing step illustrated in FIG. 3, the granulated powder particles 21 are laid on the jig 50 in place of the table 10 to directly form the first powder layer 11 on the jig 50. In this manner, in the first modification, the jig 50 is used as a base on which the granulated powder particles 21 as a powder are laid. Furthermore, in process p2 illustrated in FIG. 3, by allowing the second binder 4 to reach the granulated powder particles 21 that are in contact with the jig 50 in the first powder layer 11, the granulated powder particles 21 are bound to the jig 50.

As described above, the discharge surface treatment electrode 1 illustrated in FIG. 7 is bound in advance to the jig 50 for attaching the discharge surface treatment electrode 1 to a discharge surface treatment device. Here, the discharge surface treatment electrode 1 is formed with a certain degree of porosity, and therefore has a characteristic of being brittle. Thus, in a case where the discharge surface treatment electrode 1 is directly held in order to bond the discharge surface treatment electrode 1 to the jig 50, the discharge surface treatment electrode 1 may be broken by the holding force. In contrast, according to the first modification, the discharge surface treatment electrode 1 is formed such that it is bound to the jig 50; therefore, the discharge surface treatment electrode 1 can be handled by holding the jig 50. Thus, in the discharge surface treatment electrode 1 according to the first modification, the discharge surface treatment electrode 1 can be prevented from being broken due to the holding. Furthermore, the larger discharge surface treatment electrode 1 is more brittle; therefore, the larger discharge surface treatment electrode 1 is difficult to handle. However, according to the first modification, the discharge surface treatment electrode 1 is formed while being supported by the jig 50 in advance, and this makes handling easy. Therefore, the size of the discharge surface treatment electrode 1 can be increased.

Figure 8:
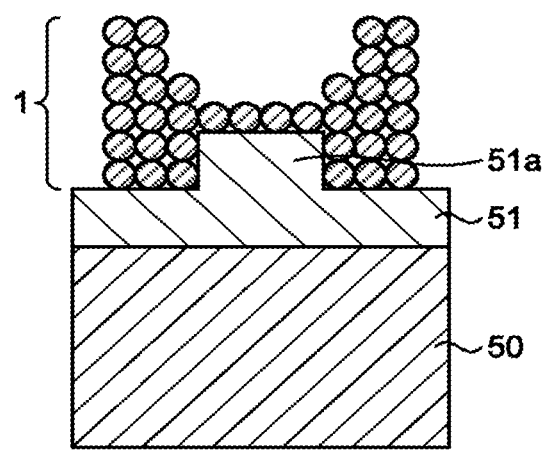
FIG. 8 is a diagram illustrating a discharge surface treatment electrode according to a second modification of the first embodiment.

Next, a description will be given of the discharge surface treatment electrode 1 according to a second modification of the first embodiment. FIG. 8 is a diagram illustrating the discharge surface treatment electrode 1 according to the second modification of the first embodiment. In the discharge surface treatment electrode 1 according to the second modification, the discharge surface treatment electrode 1 is bound to a support portion 51 disposed on the jig 50 in the step of manufacturing the discharge surface treatment electrode 1.

Specifically, in the manufacturing step illustrated in FIG. 3, the granulated powder particles 21 are laid on the support portion 51 in place of the table 10 to directly form the first powder layer 11 on the support portion 51. In this manner, in the second modification, the support portion 51 is used as a base on which the granulated powder particles 21 as a powder are laid. Furthermore, in process p2 illustrated in FIG. 3, by also allowing the second binder 4 to reach the granulated powder particles 21 that are in contact with the support portion 51 in the first powder layer 11, the granulated powder particles 21 are bound to the support portion 51.

Similarly to the discharge surface treatment electrode 1 illustrated in the first modification, the support portion 51 may be formed directly on the jig 50 by repeating a powder laying step and a powder binding step on the jig 50. Alternatively, the support portion 51 may be formed by other methods such as a metal spraying method and a sputtering method. In addition, the separately prepared support portion 51 may be bonded to the jig 50 to form the support portion 51 on the jig 50.

Alternatively, after the support portion 51 formed on the jig 50, the discharge surface treatment electrode 1 may be formed on the support portion 51, or after the discharge surface treatment electrode 1 is formed on the support portion 51, the support portion 51 may be bonded to the jig 50.

In this way, by disposing the support portion 51 between the jig 50 and the discharge surface treatment electrode 1, in a case where the material of the jig 50 is incompatible with the material of the metal powder particles $21m$ used for the discharge surface treatment electrode 1, the support portion 51 is formed of a material compatible with both of the materials of the jig 50 and the metal powder particles $21m$ and thus compatibility between the jig 50 and the metal powder particle $21m$ can be obtained. Examples of incompatibility between different materials include galvanic corrosion occurring between titanium and an aluminum alloy.

In addition, by disposing the support portion 51 at a portion of the discharge surface treatment electrode 1 that is unnecessary in an actual discharge surface treatment, the powder material used for manufacturing the discharge surface treatment electrode 1 can be reduced and manufacturing cost can be suppressed. Furthermore, as illustrated in FIG. 8, the support portion 51 is provided with a protruding portion 51$a$; therefore, the shape of the discharge surface treatment electrode 1 can be closer to a shape of only a portion necessary for a discharge surface treatment. Therefore, the powder material used for manufacturing the discharge surface treatment electrode 1 can be further reduced.

Furthermore, according to the second modification, similarly to the case where the discharge surface treatment electrode 1 is formed on the jig 50, the discharge surface treatment electrode 1 can be handled by holding the support portion 51 or the jig 50. Therefore, the discharge surface treatment electrode 1 can be prevented from being broken due to the discharge surface treatment electrode 1 being held. In addition, the size of the discharge surface treatment electrode 1 can be increased.

Second Embodiment

Figure 9:
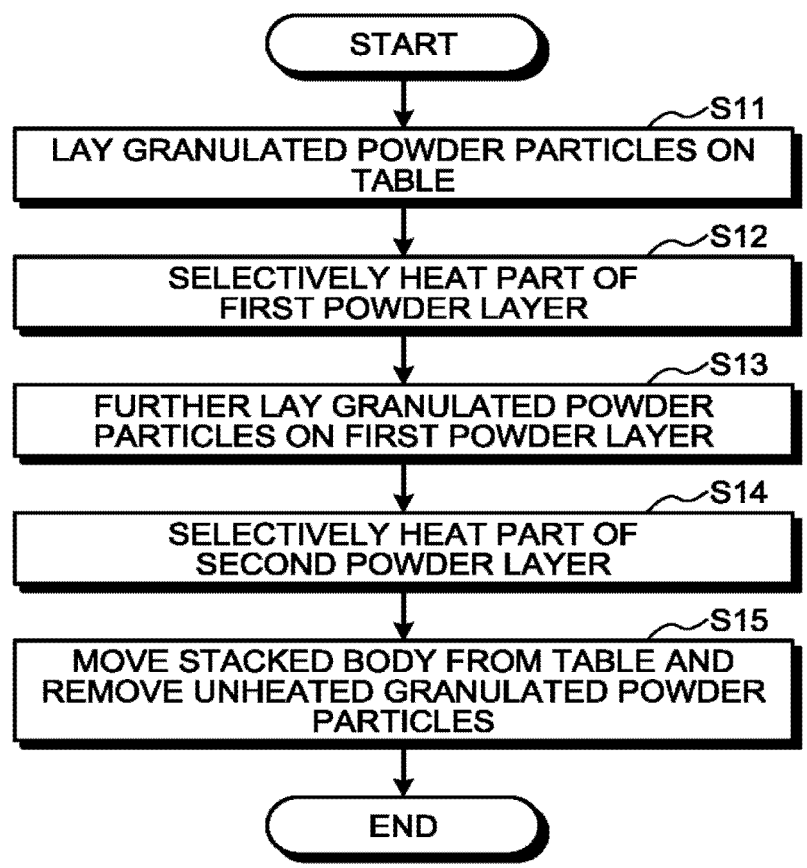
FIG. 9 is a flowchart illustrating a method for manufacturing a discharge surface treatment electrode according to a second embodiment of the present invention.
Figure 10:
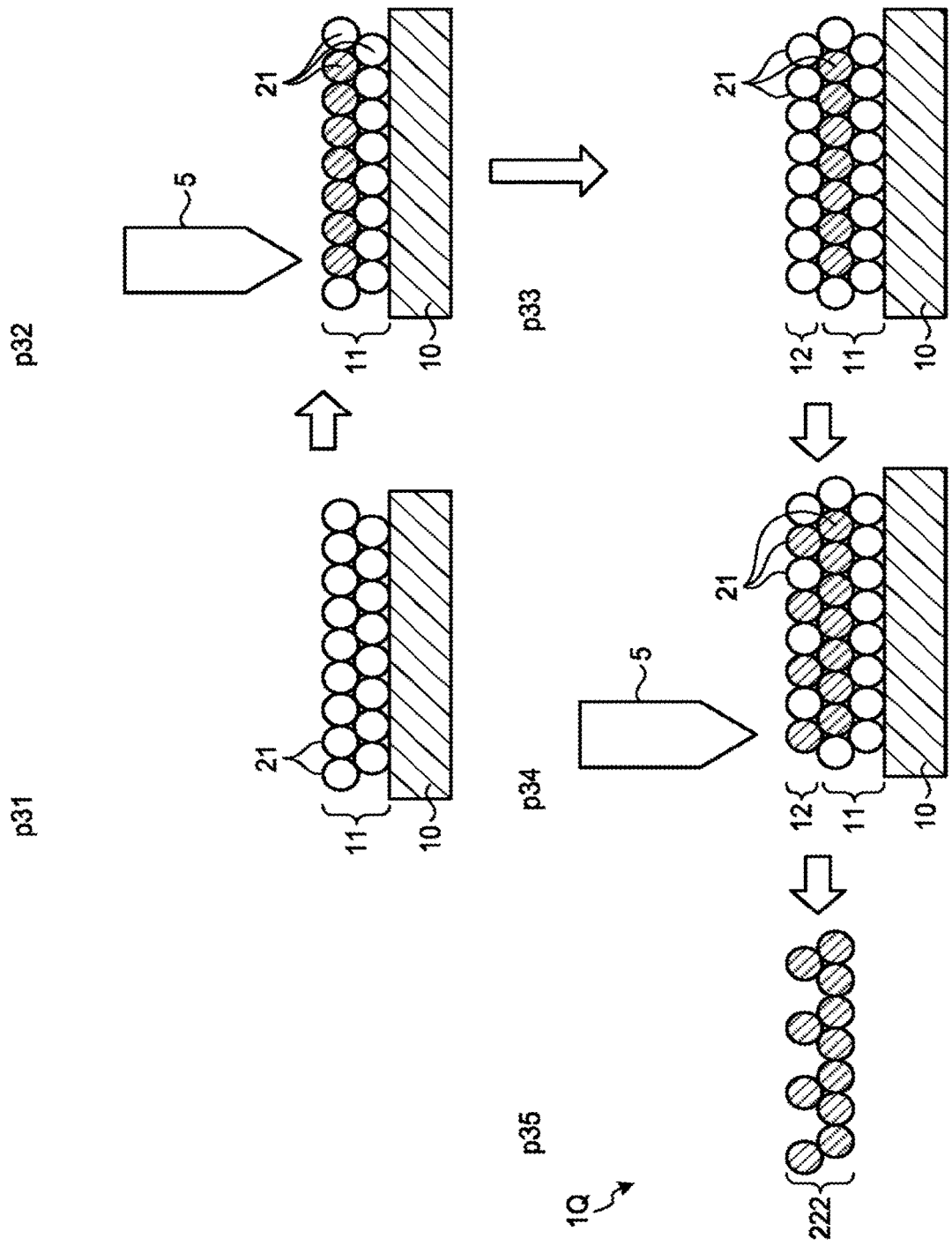
FIG. 10 is a diagram illustrating steps of manufacturing the discharge surface treatment electrode according to the second embodiment.

FIG. 9 is a flowchart illustrating a method for manufacturing a discharge surface treatment electrode 1Q according to a second embodiment of the present invention. FIG. 10 is a diagram illustrating steps of manufacturing the discharge surface treatment electrode 1Q according to the second embodiment. The same reference numerals are given to the same components as those of the above first embodiment, and a detailed description thereof will be omitted. In a method for manufacturing the discharge surface treatment electrode 1Q according to the second embodiment, some of the granulated powder particles 21 are selectively sintered or calcined without using a second binder, and the granulated powder particles 21 are bound thereby to each other. Hereinafter, the method for manufacturing the discharge surface treatment electrode 1Q according to the second embodiment will be described in detail.

First, in process p31 illustrated in FIG. 10, a first laying step of laying the granulated powder particles 21 on the table 10 is performed (step S11). In the first laying step, the first powder layer 11 is formed on the table 10. Here, the table 10 is used as a base on which the granulated powder particles 21, which are a powder, are laid. Subsequently, in process p32 illustrated in FIG. 10, part of the first powder layer 11 is selectively heated by the heating device 5 (step S12).

In step S12, the selectively heated granulate powder particles 21 are heated to a sintering temperature or a calcining temperature, and the metal powder particles $21m$ contained in the selectively heated granulated powder particles 21 are thereby sintered or calcined and are bound to each other. That is, in step S12, a first binding step of binding the metal powder particles $21m$ contained in the selectively heated granulated powder particles 21 to each other is performed.

In the second embodiment, in step S12, the metal powder particles $21m$ are sintered or calcined, and therefore the first binder $21b$ contained in the granulated powder particles is sublimed at this point of time. Thus, in step S12, fumes and gas generated by sublimation of the first binder $21b$ are desirably recovered by a recovery device.

In addition, the type of a heat source used for the heating device 5 is not particularly limited. However, the heat source needs to be a heat source that can raise the temperature to a sintering temperature or a calcining temperature by selectively inputting energy into part of a powder layer. Examples of such a heat source include a heat source that emits an electron beam or a laser. However, the energy supplied from a heat source is not required to have strength sufficient to raise the temperature to such a level that the metal powder particle $21m$ is melted, and is only required to have such strength as to raise the temperature to a temperature at which the metal powder particle $21m$ is sintered or calcined. In a case where the heat source used for the heating device 5 is a heat source that emits a laser, it is satisfactory if tens to hundreds of watts of energy is obtained. In a case where the heat source used for the heating device 5 is a heat source that emits an electron beam, it is satisfactory if 1,000 to 3,000 watts enough to calcine the metal powder particles $21m$ is obtained.

In step S12, the granulated powder particles 21 are desirably heated in an inert gas atmosphere or a vacuum environment. Examples of the inert gas include nitrogen, argon, and helium. The granulated powder particles 21 are desirably heated by irradiation with an electron beam in a vacuum environment from a viewpoint of preventing oxidation of the metal powder particles $21m$ at the time of sintering or calcining. However, these descriptions do not exclude heating the granulated powder particles 21 in the atmosphere and heating the granulated powder particles 21 using other heat sources.

Subsequently, in process p33 illustrated in FIG. 10, a second laying step of further laying the granulated powder particles 21 on the first powder layer 11 is performed (step S13). In the second laying step, the second powder layer 12 is formed on the first powder layer 11.

Subsequently, in process p34 illustrated in FIG. 10, part of the second powder layer 12 is selectively heated by the heating device 5 (step S14). In step S14, the selectively heated granulated powder particles 21 are heated to a sintering temperature or a calcining temperature, and the metal powder particles 21 in contained in the selectively heated granulated powder particles 21 are thereby sintered or calcined and are bound to each other. That is, in step S14, a second binding step of binding the metal powder particles 21m contained in the selectively heated granulated powder particles 21 to each other is performed. In addition, the first binder 21b contained in the granulated powder particles 21 is sublimed at this point of time. Furthermore, as illustrated in FIG. 10, in process p34, the area of the heated granulated powder particles is smaller than that in the first powder layer 11.

In the second binding step, the metal powder particles 21m contained in the heated granulated powder particles 21 in the second powder layer 12 are also bound to the first powder layer 11. As a result, a stacked body 222 in which a plurality of the metal powder particles 21m are bound to each other is obtained. Thereafter, by repeating the second laying step and the second binding step, the stacked body 222 having a desired thickness is obtained.

Subsequently, in process p35 illustrated in FIG. 10, the stacked body 222 is moved from the table 10 to remove the unheated granulated powder particles 21 (step S15). In order to facilitate removal of the stacked body 222 from the table 10, when the first powder layer 11 is heated, the granulated powder particles 21 that are in contact with the table 10 are not heated. As a result, the region formed by the metal powder particles 21m contained in the granulated powder particles 21 that are in contact with the table 10 becomes a non-bound region that is not bound to the table 10; therefore, removal of the stacked body 222 is facilitated. Energy input into the granulated powder particles 21 that are in contact with the table 10 may be kept lower than the energy input into the granulated powder particles 21 stacked on the upper layer. In this case, the binding force of the metal powder particles 21m contained in the granulated powder particles 21 that are in contact with the table 10 to the table 10 is lower than the binding force between the metal powder particles 21m contained in the granulated powder particles 21 in the upper layer. As a result, the region formed by the granulated powder particles 21 that are in contact with the table 10 becomes a low bound region in which the binding force to the table 10 is reduced, and removal the stacked body 222 can be facilitated.

In the second embodiment, in steps S12 and S14 i.e., in the first binding step and the second binding step, the first binder 21b is sublimed and the metal powder particles 21m are sintered or calcined. Thus, the stacked body 222 can be used as it is as the discharge surface treatment electrode IQ in which no paraffin remains. Thus, an inputting step of inputting the stacked body 222 into a high-temperature furnace is unnecessary unlike the first embodiment. As a result, manufacturing equipment for manufacturing the discharge surface treatment electrode 1 and a manufacturing step can be simplified.

In the discharge surface treatment electrode 1Q manufactured by the manufacturing method described above, by controlling the position of the granulated powder particles 21 to be heated, the ratio of the metal powder particles 21m that are bound in the first powder layer 11 can be different from that in the second powder layer 12. To put it in other words, the porosity of the region formed by using the first powder layer 11 can be different from that of the region formed by using the second powder layer 12 in the discharge surface treatment electrode 1Q.

In the example illustrated in FIG. 10, the ratio of the granulated powder particles 21 heated in the second powder layer 12 is lower than the ratio of the granulated powder particles 21 heated in the first powder layer 11. That is, the porosity of the second powder layer 12 is higher than that of the first powder layer 11. In this manner, in the method for manufacturing the discharge surface treatment electrode 1Q according to the second embodiment, a region with a different porosity from the other regions can be formed inside the discharge surface treatment electrode IQ. In addition, by reducing the porosity of the first powder layer 11 stacked in the earlier stage, stacking can be stabilized at the initial stage of formation of the stacked body 222. The porosity of the first powder layer 11 may be increased and the porosity of the second powder layer 12 may be reduced.

Furthermore, the metal powder particles 21m contained in the granulated powder particles 21 at a desired position can be bound to each other. Thus, by changing the position to be heated, the discharge surface treatment electrode 1Q can be manufactured in various shapes. Therefore, it is unnecessary to manufacture molds according to discharge surface treatment electrodes having different shapes unlike the case of manufacturing a discharge surface treatment electrode by forming a green compact. In addition, it is unnecessary to form a discharge surface treatment electrode into a desired shape by performing post-processing. Thus, the cost of manufacturing a mold according to a shape or cost of performing post-processing can be reduced. This enables manufacturing cost of the discharge surface treatment electrode to be suppressed. These descriptions do not exclude shaping the discharge surface treatment electrode 1Q according to the second embodiment by post-processing the discharge surface treatment electrode 1Q.

The material of the metal powder particles contained in the granulated powder particles 21 used in the first powder layer 11 may be different from that used in the second powder layer 12. It is of course possible to, in a case of repeating the second laying step and the second binding step, use a different material for the metal powder particles 21m contained in the granulated powder particles 21 in each of the stacked power layers.

Furthermore, in steps S11 and S13, not the granulated powder particles 21 but the metal powder particles 21m may be directly laid. Even in this case, the metal powder particles 21m can be bound to each other by sintering or calcining the metal powder particles 21m at a desired position by selectively heating the metal powder particles 21m by the heating device 5. When the metal powder particles 21m are directly laid, the first binder 21b is not sublimed at the time of heating. Thus, a recovery device for recovering fumes and gas generated by sublimation of the first binder 21b is unnecessary.

It is of course possible to manufacture the discharge surface treatment electrode 1Q having a porosity controlled as illustrated in FIGS. 4, 5, and 6 of the first embodiment by the method for manufacturing the discharge surface treatment electrode 1Q according to the second embodiment and perform a discharge surface treatment by using the discharge surface treatment electrode 1Q. Also in this case, a similar effect to that described in the first embodiment can be obtained.

Furthermore, as illustrated in FIGS. 7 and 8 of the first embodiment, the discharge surface treatment electrode 1Q may be formed on the jig 50 or the support portion 51 by the method for manufacturing the discharge surface treatment electrode 1Q according to the second embodiment. Also in this case, a similar effect to that described in the first embodiment can be obtained.

Third Embodiment

Figure 11:
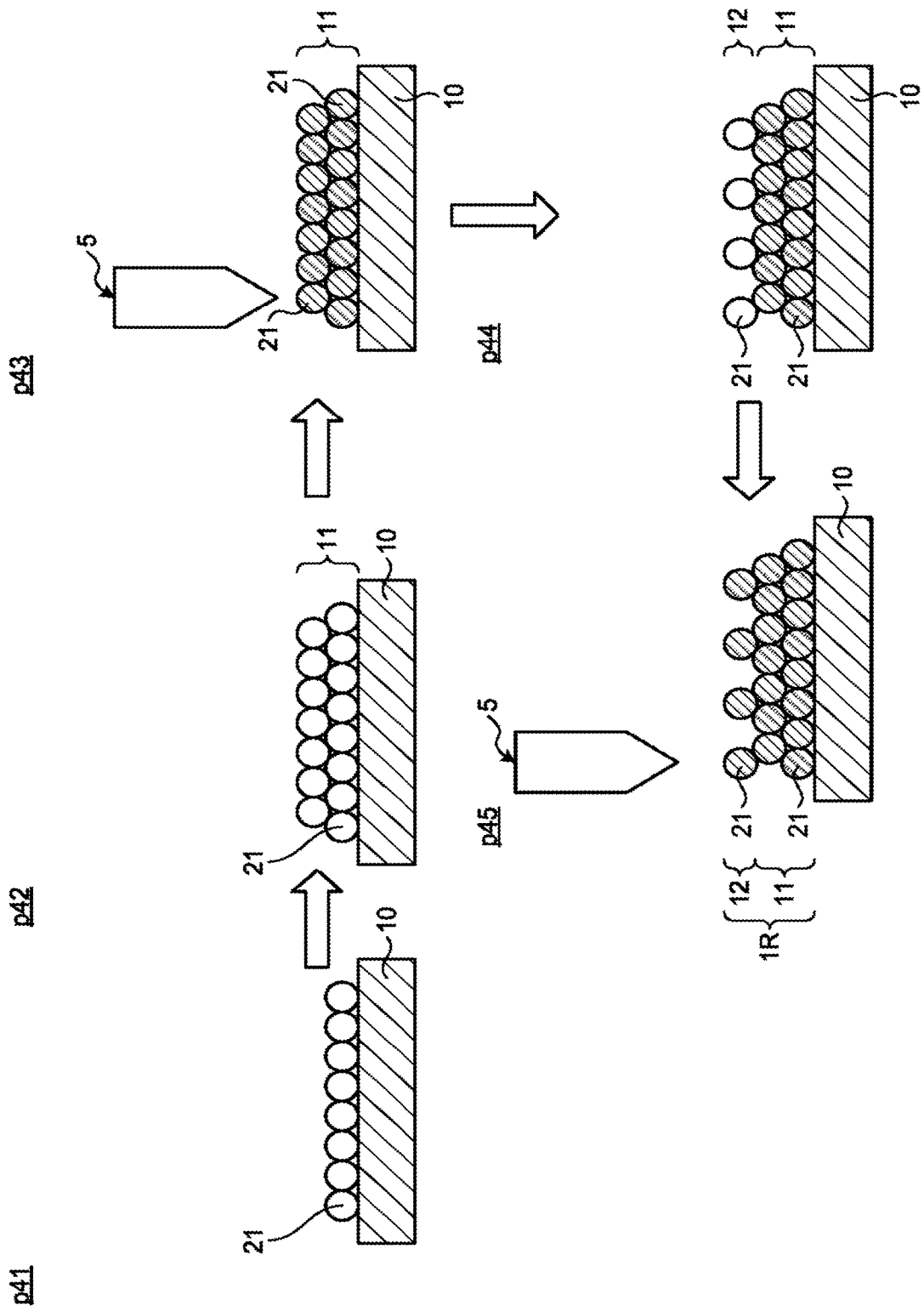
FIG. 11 is a diagram illustrating a method for manufacturing a discharge surface treatment electrode according to a third embodiment of the present invention.

FIG. 11 is a diagram illustrating a method for manufacturing a discharge surface treatment electrode 1R according to a third embodiment of the present invention. The same reference numerals are given to the same components as those of the above embodiments, and a detailed description thereof will be omitted. In processes p41 to p45 illustrated in FIG. 11, the granulated powder particles 21 are supplied onto the table 10 or the first powder layer 11 in a desired pattern shape. Then, the granulated powder particles 21 formed in a desired pattern shape are heated by the heating device 5, and the granulated powder particles 21 are bound to each other or the metal powder particles 21m are bound to each other by solidifying the first binder 21b contained in the granulated powder particles 21 after remelting or by sintering or calcining the metal powder particles 21m contained in the granulated powder particles 21. A second binder may be injected toward the granulated powder particles to bind the granulated powder particles to each other. As a result, the discharge surface treatment electrode 1R is obtained. In the third embodiment, by changing the shape of a desired pattern, the discharge surface treatment electrode 1R having a region with porosity different from the other regions can be obtained. In the example illustrated in FIG. 11, a region formed by the second powder layer 12 has a higher porosity than a region formed by the first powder layer 11.

Fourth Embodiment

Figure 12:
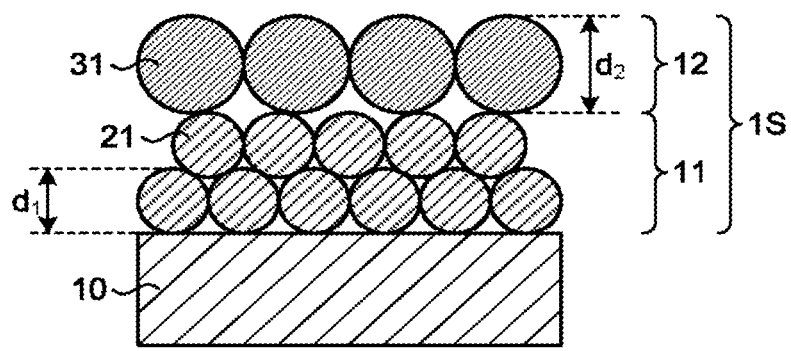
FIG. 12 is a diagram illustrating a discharge surface treatment electrode according to a fourth embodiment of the present invention.

FIG. 12 is a diagram illustrating a discharge surface treatment electrode 1S according to a fourth embodiment of the present invention. In the fourth embodiment, a particle diameter $d_1$ of the granulated powder particles 21 used in the first powder layer 11 is different from a particle diameter $d_2$ of granulated powder particles 31 used in the second powder layer 12. Specifically, the particle diameter $d_2$ of the granulated powder particles 31 is larger than the particle diameter $d_1$ of the granulated powder particles 21. A region formed by the second powder layer 12 in which the granulated powder particles 31 having a larger particle diameter are laid can have a higher porosity than a region formed by the first powder layer 11.

Although detailed illustration is omitted, the granulated powder particle 31 is also formed by collecting and binding a plurality of metal powder particles to each other with a first binder. Also in the fourth embodiment, the first powder layer 11 is formed, the granulated powder particles 21 are bound to each other in the first powder layer 11, the second powder layer 12 is formed on the first powder layer 11, and the granulated powder particles 31 are bound to each other in the second powder layer 12. As described in the above other embodiments, the binding of the granulated powder particles 21 in the first powder layer 11 and the binding of the granulated powder particles 31 in the second powder layer 12 may be achieved by supplying the second binder 4, by solidifying the first binder contained in the granulated powder particles after remelting, or by performing sintering or calcining due to supply of energy from a heat source.

Figure 13:
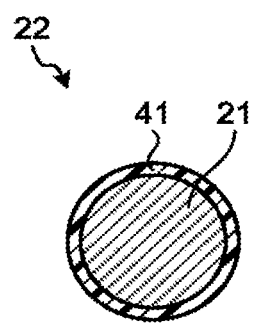
FIG. 13 is a cross-sectional view illustrating a granulated powder particle used for manufacturing the discharge surface treatment electrode according to the fourth embodiment.

FIG. 13 is a cross-sectional view illustrating a granulated powder particle 22 used for manufacturing the discharge surface treatment electrode 1S according to the fourth embodiment. In the granulated powder particle 22 illustrated in FIG. 13, a binder film 41 is formed around the granulated powder particle 21. The particle diameter of the granulated powder particle 22 can be changed by changing the film thickness of the binder film 41. In this manner, the discharge surface treatment electrode illustrated in FIG. 12 may be manufactured using the granulated powder particles 22 having different particle diameters by changing the film thickness of the binder film 41. In particular, the larger the film thickness of the binder film 41 is, the larger the distance between the laid granulated powder particles 21 is. Therefore, the porosity of the discharge surface treatment electrode 1S can be controlled by changing the thickness of the binder film 41.

Note that the configurations described in the foregoing embodiments are examples of the present invention; combining with other publicly known techniques is possible, and partial omissions and modifications are possible without departing from the spirit of the present invention.

REFERENCE SIGNS LIST 1, 1Q, 1R, 1S discharge surface treatment electrode; 2, 222 stacked body; 3 binder injection device; 4 second binder; 5 heating device; 10 table; 11 first powder layer; 12 second powder layer; 20 first region; 23 recess portion; 30 second region; 40 third region; 50 jig; 51 support portion; 51a protruding portion; 21, 22, 31 granulated powder particle; 21b first binder; 21m metal powder particle; 120 third film; 130 second film; 140 first film; 150 workpiece; 220 first film; 230 second film.

The invention claimed is:

1. A method for manufacturing a discharge surface treatment electrode, the method comprising:
a first laying of laying powder particles so as to form a first powder layer;
a first binding of binding some of the powder particles in the first powder layer to each other;
a second laying of further laying the powder particles on the first powder layer in which some of the powder particles are bound to each other so as to form a second powder layer, wherein the powder particles in the first powder layer and the powder particles in the second powder layer include a same type of granulated powder particles having a particle size distribution of a first value; and
a second binding of binding some of the powder particles in the second powder layer to each other so as to form a stacked body of the powder particles, wherein
a region having a different porosity from another region is formed inside the stacked body based on different positions of application of a binder toward the powder particles in the first binding and the second binding.

2. The method for manufacturing the discharge surface treatment electrode according to claim 1, wherein the first binding and the second binding in the application of the binder include selectively injecting a binder toward the powder particles to be bound.

3. The method for manufacturing the discharge surface treatment electrode according to claim 2, further comprising inputting the stacked body into a furnace and sintering or calcining the powder particles.

4. The method for manufacturing the discharge surface treatment electrode according to claim 1, wherein the first binding and the second binding include selectively heating the powder particles to be bound.

5. The method for manufacturing the discharge surface treatment electrode according to claim 4, wherein the powder particles are calcined or sintered by the heating.

6. The method for manufacturing the discharge surface treatment electrode according to claim 4, wherein
the powder particle is a granulated powder particle in which metal powder particles and a binder are mixed, and the binder is melted by the heating and then the melted binder is solidified.

7. The method for manufacturing the discharge surface treatment electrode according to claim 1, wherein
the first powder layer is laid on a base, and
the first powder layer and the base are bound to each other in the first binding.

8. The method for manufacturing the discharge surface treatment electrode according to claim 1, wherein
the first powder layer is laid on a base, and
a region that is in contact with the base in the first powder layer is a non-bound region that is not bound to the base or a low bound region in which a binding force to the base is lower than a binding force between the powder particles in another region.

9. The method for manufacturing the discharge surface treatment electrode according to claim 1, wherein the stacked body has regions with different porosities in a direction in which the powder particles are stacked.

10. The method for manufacturing the discharge surface treatment electrode according to claim 1, wherein the stacked body has regions with different porosities in a direction perpendicular to a direction in which the powder particles are stacked.

11. A method for manufacturing a film body, the method comprising:
causing the discharge surface treatment electrode manufactured by the method for manufacturing the discharge surface treatment electrode according to claim 1 to face a workpiece; and
forming a film on the workpiece by applying a voltage to the discharge surface treatment electrode and generating a discharge phenomenon between the discharge surface treatment electrode and the workpiece.

12. The method for manufacturing the discharge surface treatment electrode according to claim 1, wherein a first porosity of the powder particles in the first powder layer is less than a second porosity of the powder particles in the second powder layer.

* * * * *